(12) United States Patent
Zheng et al.

(10) Patent No.: US 11,321,746 B2
(45) Date of Patent: May 3, 2022

(54) AD SIMULATOR BROWSER EXTENSION

(71) Applicant: Capital One Services, LLC, McLean, VA (US)

(72) Inventors: Hanzhang Zheng, Frisco, TX (US); Praveen Tandra, Allen, TX (US); Mahesh Senniappan, Plano, TX (US); Raman Bajaj, Frisco, TX (US); Sanjiv Yajnik, Dallas, TX (US); Parvesh Kumar, Plano, TX (US); Gopi Kancharla, Frisco, TX (US)

(73) Assignee: CAPITAL ONE SERVICES, LLC., McLean, VA (US)

( * ) Notice: Subject to any disclaimer, the term of this patent is extended or adjusted under 35 U.S.C. 154(b) by 133 days.

(21) Appl. No.: 16/559,818

(22) Filed: Sep. 4, 2019

(65) Prior Publication Data

US 2021/0065254 A1 Mar. 4, 2021

(51) Int. Cl.
*G06Q 30/02* (2012.01)
*H04L 67/02* (2022.01)
*H04L 41/08* (2022.01)
*H04L 67/56* (2022.01)

(52) U.S. Cl.
CPC ..... *G06Q 30/0278* (2013.01); *G06Q 30/0255* (2013.01); *H04L 67/02* (2013.01); *H04L 41/08* (2013.01); *H04L 67/28* (2013.01)

(58) Field of Classification Search
CPC ....... G06Q 30/0278; G06Q 30/0255; H04L 67/02; H04L 41/08; H04L 67/28
See application file for complete search history.

(56) References Cited

U.S. PATENT DOCUMENTS

| | | | | |
|---|---|---|---|---|
| 8,732,008 | B2 * | 5/2014 | Jain | G06Q 30/02 705/14.1 |
| 2003/0005046 | A1 * | 1/2003 | Kavanagh | G06Q 30/0255 709/203 |
| 2008/0082400 | A1 * | 4/2008 | Martel | G06Q 30/02 705/14.42 |
| 2010/0293014 | A1 * | 11/2010 | Jain | G06Q 30/0243 705/14.42 |
| 2012/0166272 | A1 * | 6/2012 | Wiley | G06Q 30/0246 705/14.45 |

(Continued)

OTHER PUBLICATIONS

What Does it Take to Get a Web Page? http://www.cs.bu.edu/~best/courses/cs109/modules/getwebpage/ (Year: 2010).*

(Continued)

*Primary Examiner* — Breffni Baggot
(74) *Attorney, Agent, or Firm* — Kacvinsky Daisak Bluni, PLLC.

(57) ABSTRACT

An ad simulator having at least in-browser simulation capabilities is provided. In examples, the ad simulator may be a web browser extension, which a media developer, designer, etc. may use for ad display simulation. The browser extension may locate existing display ads on a webpage, one or more of which can be selected to be replaced with a new ad. A HyperText Transfer Protocol (HTTP) request may be made to an ad template rendering engine that returns a HyperText Markup Language (HTML) of a new ad personalized and targeted to a customer. The browser extension may then replace the existing ad with the new ad.

20 Claims, 8 Drawing Sheets

(56) References Cited

U.S. PATENT DOCUMENTS

| | | | | |
|---|---|---|---|---|
| 2013/0019149 | A1* | 1/2013 | Spencer | G11B 27/034 |
| | | | | 715/202 |
| 2016/0098783 | A1* | 4/2016 | Margalit | G06Q 30/0635 |
| | | | | 705/26.5 |
| 2017/0076092 | A1* | 3/2017 | Kashyap | G06F 21/316 |
| 2017/0104841 | A1* | 4/2017 | Duke | G06Q 30/0629 |
| 2019/0073697 | A1* | 3/2019 | Varley | G06Q 30/0276 |

OTHER PUBLICATIONS

What Does it Take to Get a Web Page? http://www.cs.bu.edu/~best/courses/cs109/modules/getwebpage/ (Year: 2010).*

Ex parte Martinez PTAB decision U.S. Appl. No. 13/551,124 (Year: 2020).*

Stephen Janaway https://www.ministryoftesting.com/dojo/lessons/top-browser-extensions-for-testing-software ) (2016) (Year: 2016).*

EditThisCookie https://web.archive.org/web/20180901000000*/http://usingprogramming.com/post/2018/04/18/doing-bad-cookie-authentication-but-for-the-right-reasons (Year: 2018).*

* cited by examiner

200

300

400

AD SIMULATOR BROWSER EXTENSION

BACKGROUND

Display advertising may involve advertising on websites, apps, social media, or the like via various media-based advertising formats, such as text, images, flash, video, and audio (which may otherwise be known as "display ads"). Display ads may typically be created or managed by rich media developers.

A common challenge for rich media developers or other types of ad designers is testing the display ads on live webpages so that they are able to obtain a first-hand experience of how the marking audience may see or react to the ads. One known solution is providing the developers or designers a testing tool that implements a proxy web server configured to intercept responses from a target website and replace occurrences of display ads with test display ads based on configured rules. A notable drawback with this solution, however, is that it requires the setup of a proxy web server and one or more tools to configure various rules for that proxy.

SUMMARY

Various embodiments are generally directed to an ad simulator having at least in-browser simulation capabilities. In examples, the ad simulator may be a web browser extension, which a media developer, designer, etc. may use for ad display simulation. The browser extension may locate existing display ads on a webpage, one or more of which can be selected to be replaced with a new ad. A HyperText Transfer Protocol (HTTP) request may be made to an ad template rendering engine that returns a HyperText Markup Language (HTML) of a new ad personalized and targeted to a customer. The browser extension may then replace the existing ad with the new ad.

DETAILED DESCRIPTION

Figure 1:
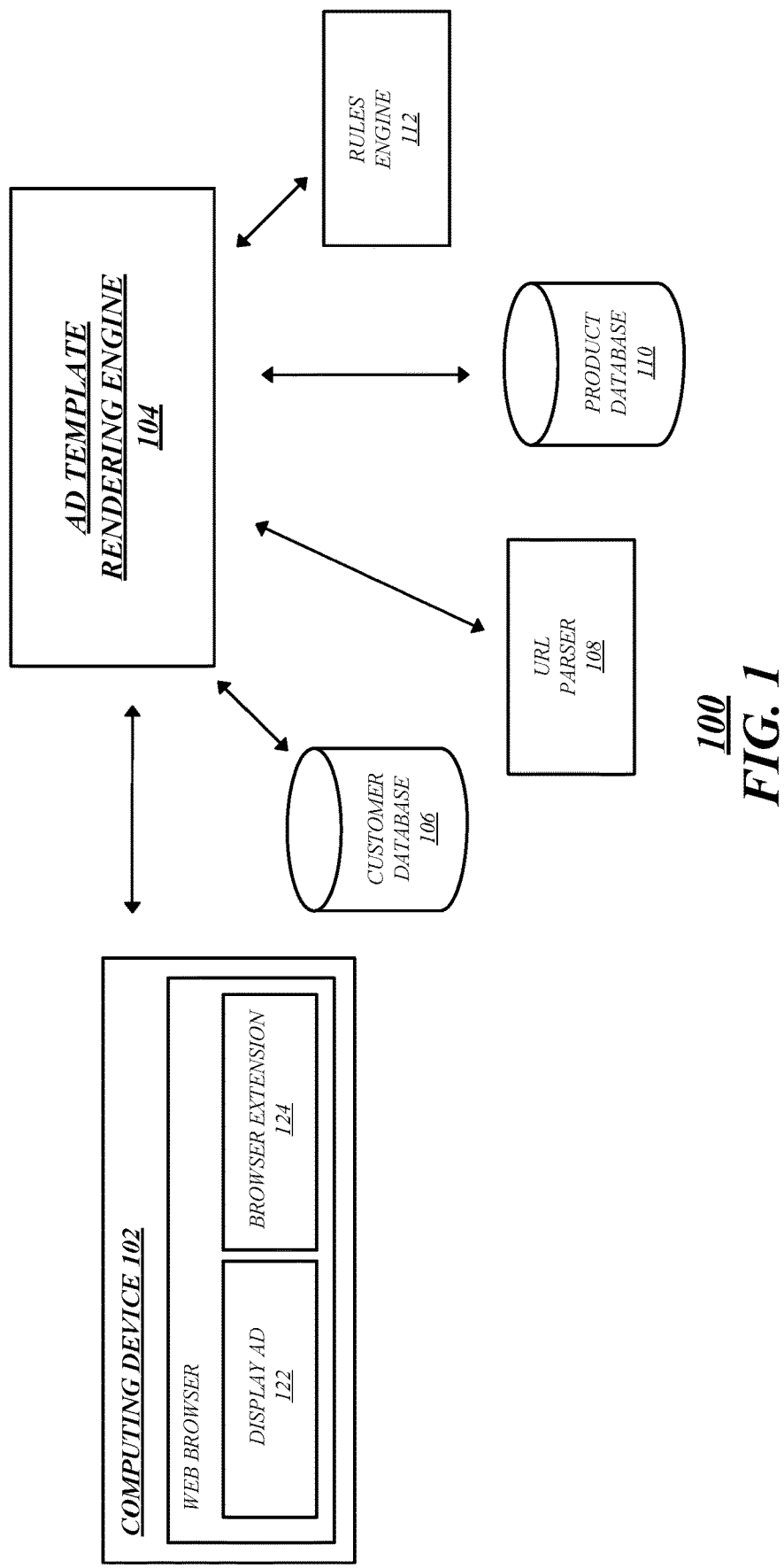
FIG. 1 illustrates an example ad simulator system in accordance with one or more embodiments.

Various embodiments are generally directed to an ad simulator having at least in-browser simulation capabilities. In examples, the ad simulator may be a browser extension provided to a user, e.g., a rich media developer, designer, etc. for ad display simulation. The browser extension may be used to locate one or more existing display ads on a webpage. The user may then select one or more of the existing display ads to replace with a new ad. A HyperText Transfer Protocol (HTTP) request to an ad template rendering engine may be initiated. It may be understood that a browser extension may be a software module that provides additional and customizable functionality to a web browser.

According to examples, the ad template rendering engine may return a HyperText Markup Language (HTML) of a new ad, which may be personalized and targeted to a customer. The browser extension may then replace the existing ad with the new ad. It may be understood that the terms "user" and "customer" used herein are distinct, e.g., "user" may broadly refer to an ad developer, designer, or the like and "customer" may broadly refer to any existing or prospective customer of a business entity or any person browsing or experiencing a webpage that may see or interact with display ads.

As described above, in known solutions, proxy servers were integrated with ad testing tools, which rendered the testing or simulation process at least inefficient, clunky, and cumbersome. The embodiments, examples, and aspects of the present disclosure overcome and are advantageous over the previous solutions in that ad display simulations can be performed directly within a user's browser in a streamlined and efficient manner such that rich media developers or other types of media content designers do not have to set up separate proxy servers and configure various tools for the proxies.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example ad simulation system 100 according to embodiments. As shown, the ad simulation system 100 may include at least a computing device 102, e.g., a user computing device, and an ad template rendering engine 104. Moreover, the ad simulation system 100 may include a customer database 106, a uniform resource locator (URL) parser 108, a product database 110, and a rules engine 112, one or more of which may be configured to communicate with the ad template rendering engine 104 for providing ad simulation capabilities at the computing device 102. Although the customer database 106, URL parser 108, product database 110, and rules engine 112 are shown as separate components from the ad template rendering engine 104, it may be understood that, in some examples, one or more of those components can be included or implemented as part of the ad template rendering engine 104. Further, it may also be understood that the ad template rendering engine 104 may be executed, run, or supported by one or more computing devices separate and distinct from the computing device 102.

In examples, a user, e.g., rich media developer, media designer, etc., may want to simulate or test the replacement of at least one display ad 122 presented on a webpage using an extension user interface of an ad simulator browser extension 124. As will be further described below, the user may select the display ad 122, which causes the browser extension 124 to trigger an HTTP request to the ad template rendering engine 104. The browser extension 124 may provide the ad template rendering engine 104 context information, such as one or more cookie values stored on the user's browser, webpage or website URL, and one or more ad dimensions, to receive, for example, a new display ad customized, personalized, and/or specifically tailored to a viewing customer.

It may be understood that since the user may be a developer using the browser extension to test the user's display ad on a real website, the user may provide sample cookie values, which may come from or correspond to one or more randomly selected customers cookies. The user may use these as sample cookie values to test that the user's display ad is generating correctly on the webpage via the browser extension, and thus, in examples the user will be supplying the cookie values from the user's browser via the browser extension, where the cookie value actually belongs to the customer.

According to embodiments, the ad template rendering engine 104 may communicate with or access the customer database 106 to look up customer information (if any exist) based on the received context information. The term "customer" in this context may refer to an existing customer of a business entity, such as a bank or a financial institution or company. If the context information produces a customer match, then a ZIP code associated with the matched customer may be obtained or retrieved by the ad template rendering engine 104. If no customer is matched (e.g., because insufficient context information is provided, because no matching customer exists), the ad template rendering engine 104 may return one or more default ads.

In further examples, based on the context information, the ad template rendering engine 104 may communicate with or access the URL parser 108 to parse out information about the website or webpage that is currently being and/or previously browsed. For instance, the URL may reveal information about a specific product that a customer may be interested in purchasing or pursuing. Thus, if the product is a specific vehicle, the URL parser 108 may parse out information related to the vehicle's make, model, condition, price, location, etc. In some examples, the URL parser 108 may be preconfigured or configured to determine, decipher, or understand the URL schema of one or more product-based websites (e.g., car-buying websites) such that if the URL provides product information (e.g., make, model, vehicle condition) in the URL, the ad template rendering engine 104 may be able to obtain such information via the parser 108.

The ad template rendering engine 104 may communicate with or access the product database 110 and identify at least one product that matches one or more of the above-described parameters, e.g., product information, customer location, etc. It may be understood that the terms "match" or "matches" may refer to an identical match, e.g., a one-to-one match, or a similarity match, e.g., a match up to a predefined threshold value, such as a percentage value. Thus, if a predetermined match threshold value is set at 90 percent, and if a product matches a parameter at least 90 percent, then it is considered a match.

According to examples, the ad template rendering engine 104 may add one or more media content, e.g., digital image, video, flash, graphics interchange format (GIF), etc., in an ad HTML with embedded hyperlinks that directs the customer to certain landing sites, such as a banking company's financing page. The ad HTML generated by the ad template rendering engine 104 may be sent to the computing device 102 such that the ad HTML is inserted in the webpage. Moreover, it may be understood that the ad simulation system 100 can dynamically and/or automatically detect the dimensions of the HTML element (e.g., display ad) to be replaced and provide a new HTML element (e.g., a new display ad) that matches the detected dimensions.

In further examples, the ad template rendering engine 104 may communicate with or access the rules engine 112, which may be configured to determine the types of ads to return to the computing device 102 in the ad HTML. For instance, if it is determined that information contained in the one or more cookie values of the received context information is not associated with a known customer, one or more default ads may be returned, as discussed above. Moreover, if it is determined that a known customer is associated with the one or more cookie values, then a personalized and tailored ad with respect to that customer may returned. The rules engine 112 may also determine a size of the returned ad HTML.

Figure 2:
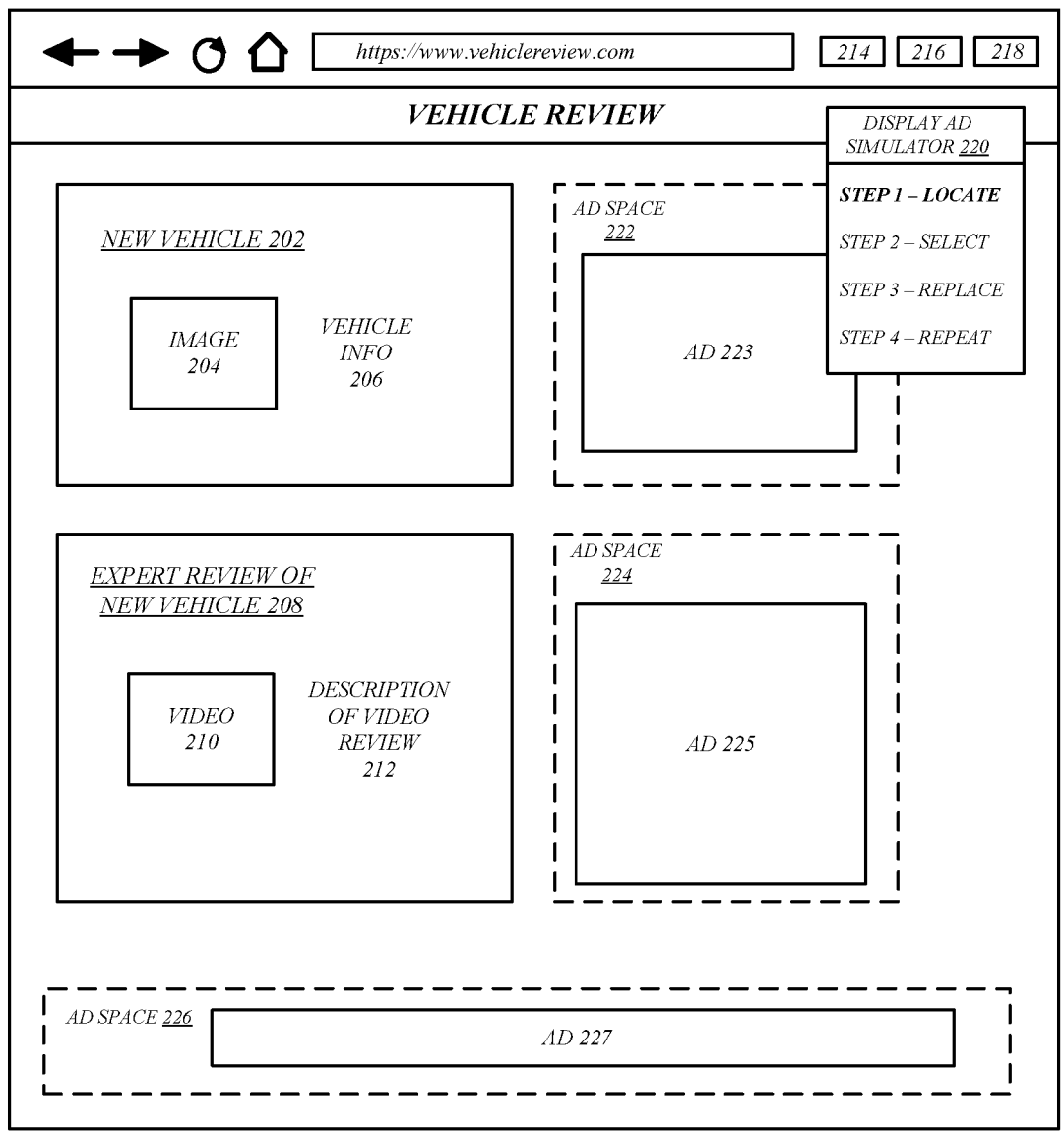
FIG. 2 illustrates a first example screenshot in accordance with one or more embodiments.

FIG. 2 illustrates an example screenshot 200 of a webpage displayed on a browser according to embodiments. As shown, various icons may be arranged at the top of the web browser, such as a back icon, a forward icon, a refresh icon, and a "home" icon. Moreover, a web address bar may be provided. Further illustrated at the top-right side of the web browser are browser extensions 214, 216, and 218. It may be understood that a browser extension may be any software module configured to customize a web browser and may allow any type of programmed functionality, such as interface modifications, ad blocking, cookie management, etc. In examples, browser extension 216 may be a display ad simulator browser extension, when selected by a user (e.g., a rich media developer), may display a display ad simulator interface 220, which will be further described below.

The displayed webpage may be of a vehicle review website, which may be accessed by typing in a URL address of the vehicle review service, as shown. The webpage may include one or more designated areas for different types of information. For example, at the top-left portion of the webpage, information related to a new vehicle 202 may be presented, such as an image 204 and vehicle information 206 of the new vehicle 202. At the bottom-left portion of the webpage, information related to expert review of the new vehicle 208 may be provided along with a video 210 of the review and a textual description of the video review 212.

Moreover, to the top-right and bottom-right sides and the bottom most portion of the websites, there may be designated ad spaces 222, 224, and 226, respectively. One or more display ads may be included within the ad spaces. For instance, ad 223 may be displayed within ad space 222, ad 225 may be displayed within ad space 224, and ad 227, which may be a banner ad, may be displayed within ad space 226.

According to embodiments, the user may want to replace one or more of the ads 223, 225, and 227 with a new ad that may be personalized to a customer. The user may select the display ad simulator browser extension 216 to utilize the display ad simulator interface 220. As shown, the interface 220 may allow the user to select one of at least four options, such as locating all ads on the webpage, selecting one or more of the located ads, replacing the selected one or more ads, and optionally repeating any one of the aforementioned features.

In FIG. 2, for example, the user may select the locate feature via the display ad simulator interface 220, which locates (and, in some instances, highlights) the ads 223, 225, and 227 on the webpage. In examples, the location of the ads may be based on whether or not HTML elements on the webpage contain ad-based identifiers or any type of information indicating that the HTML element is an advertisement.

Figure 3:
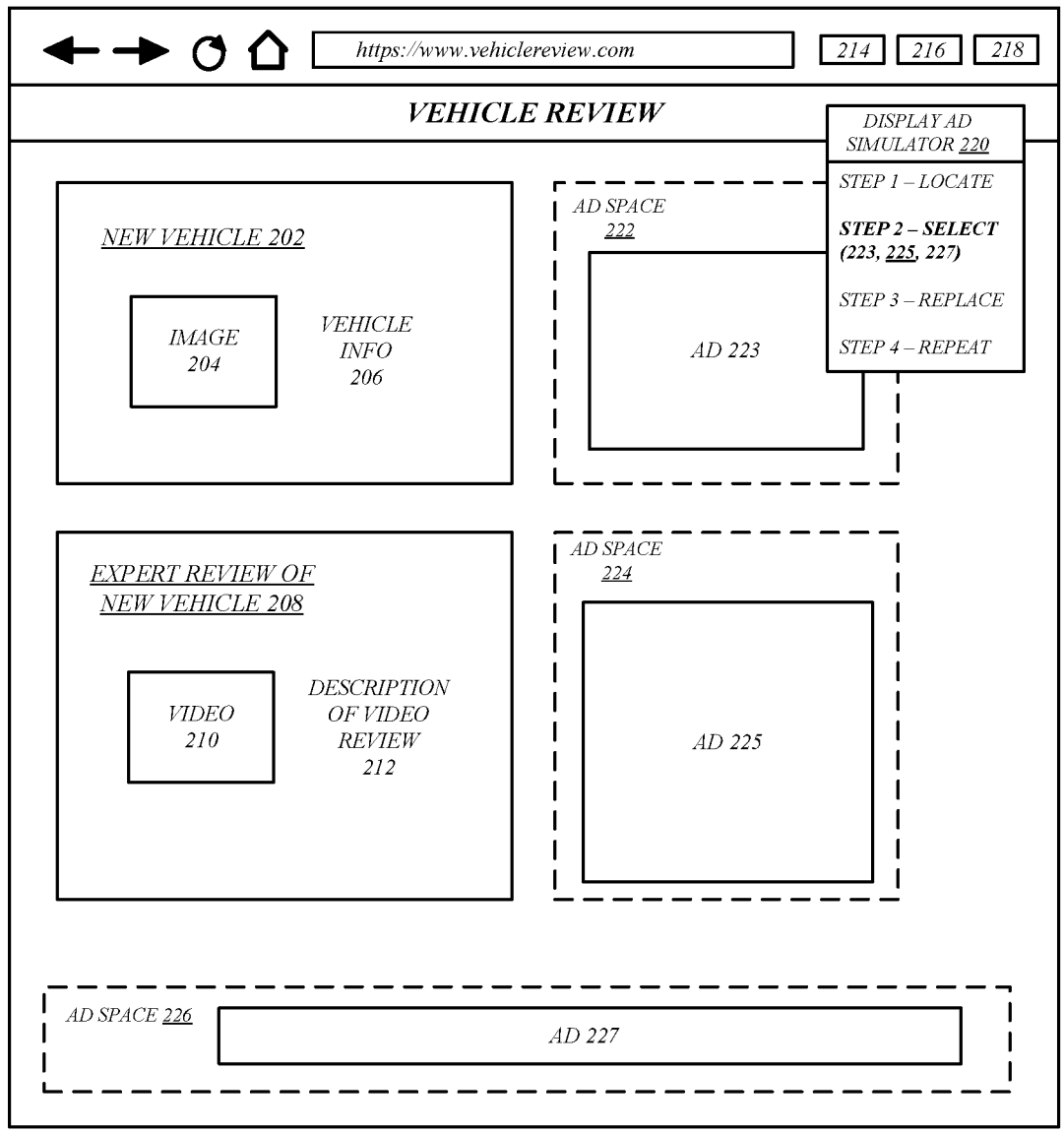
FIG. 3 illustrates a second example screenshot in accordance with one or more embodiments.

FIG. 3 illustrates an example screenshot 300 of a webpage displayed on a browser according to embodiments. For ease of explanation, the same webpage of the vehicle review website, web browser, and browser components shown in FIG. 2 are illustrated in FIG. 3.

As described above, the user may open the display ad simulator interface 220 and select the "locate" icon to identify and locate one or more ads on the displayed webpage. Upon locating the ads, e.g., ads 223, 225, and 227, the user may then select, for example, the "select" icon the simulator interface 220 to select one or more of the located ads for replacement. In some examples, the ads that are selectable for replacement may be displayed for the user under the "select" icon, as shown. The user may select one or more of the ads for replacement by specifying, e.g., by touching, tapping, or clicking, the displayed-selectable ads. For example, the user may select ad 225 to be replaced with a new ad, as shown in underline. In further examples, the user may select an ad to be replaced from a dropdown selection interface of all available display ads on the webpage. And although not shown, in other examples, the user may right-click on a particular HTML element (e.g., ad 255) and select a "replace" option from a display menu. If the HTLM element is not available for replacement, then the "replace" option may not be displayed in the display menu for selection.

Ad 225 may be a generic ad of the new vehicle 202, which may contain a hyperlink to one or more websites for purchasing the new vehicle 202. The user may desire to replace ad 225 with a more personalized ad. For example, the personalized ad may be directed to a customer of a banking company and may include one or more hyperlinks to financing offers for the new vehicle 202. Moreover, the personalized ad may also contain hyperlinks to dealerships offering the new vehicle for sale within a predefined distance from the customer's location.

Figure 4:
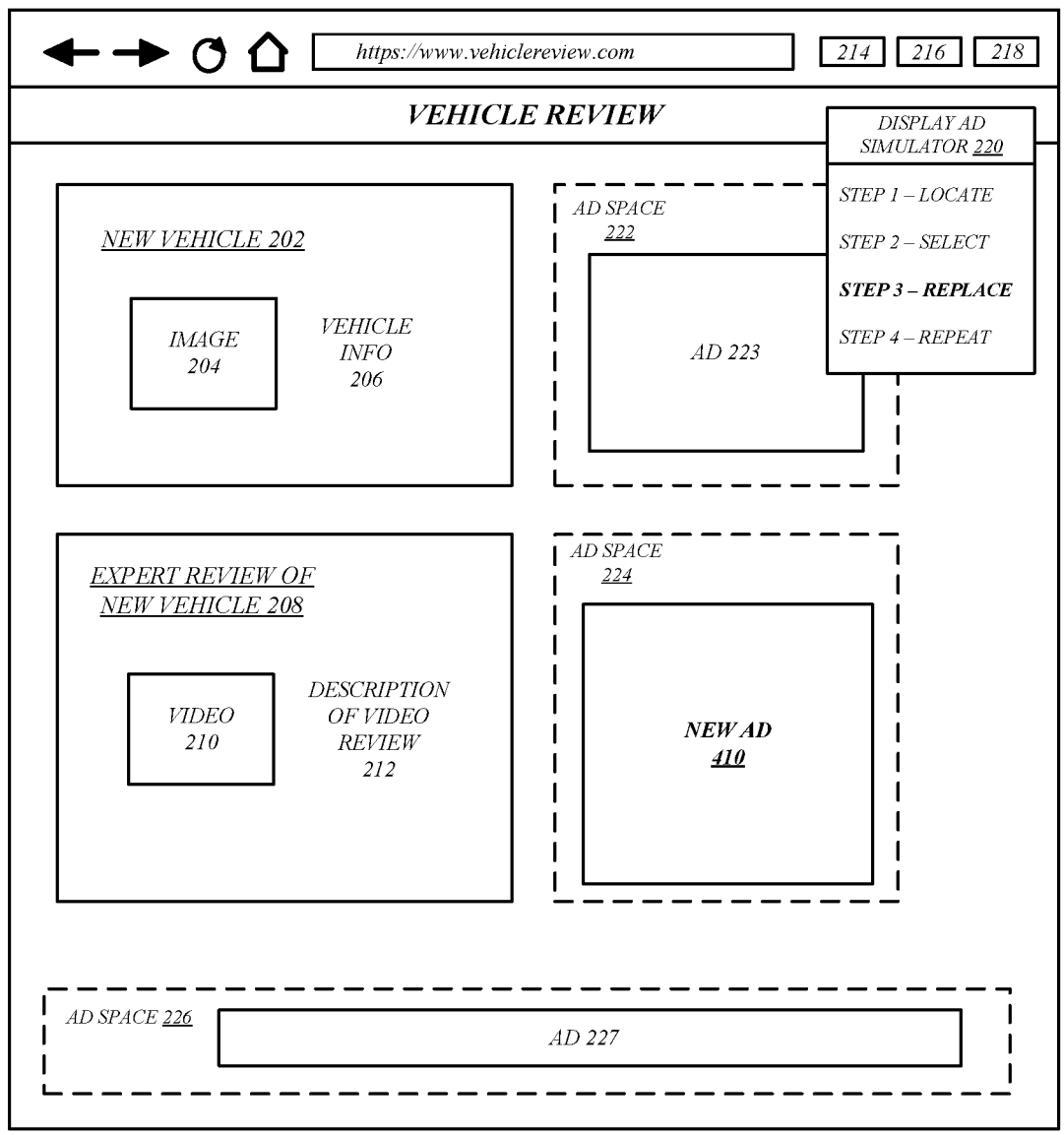
FIG. 4 illustrates a third example screenshot in accordance with one or more embodiments.

FIG. 4 illustrates an example screenshot 400 of a webpage displayed on a browser according to embodiments. For ease of explanation, the same webpage of the vehicle review website, web browser, and browser components shown in FIG. 2 and FIG. 3 are illustrated in FIG. 4.

According to examples, upon making one or more selections of the ads to be replaced, e.g., ad 225 as described above, the user may select the "replace" icon on the display ad simulator interface 220. Upon selecting the "replace" icon, ad 225 may be removed and new ad 410 may be added, as shown. For instance, the new ad 410 may be related in some way to the new vehicle 202, e.g., financing offers, etc.

As described above, the new ad 410 may be a personalized ad directed to a customer of a banking customer. In embodiments, the new ad 410 may contain several ad components. For example, at least one hyperlink may be provided in the new ad 410 directing the customer to one or more financing offers (by the banking company) for the new vehicle 202. Moreover, one or more images of the new vehicle 202 that are for sale within a predefined distance from the customer's geographical location, e.g., customer's home, may be displayed and linked. It may be understood that ads 223 and 226 may be replaced in a similar manner. Furthermore, the display ad simulator interface 200 may include option for the user to repeat one or more of the previous steps, e.g., locate ads, select ads, replace ads.

Figure 5:
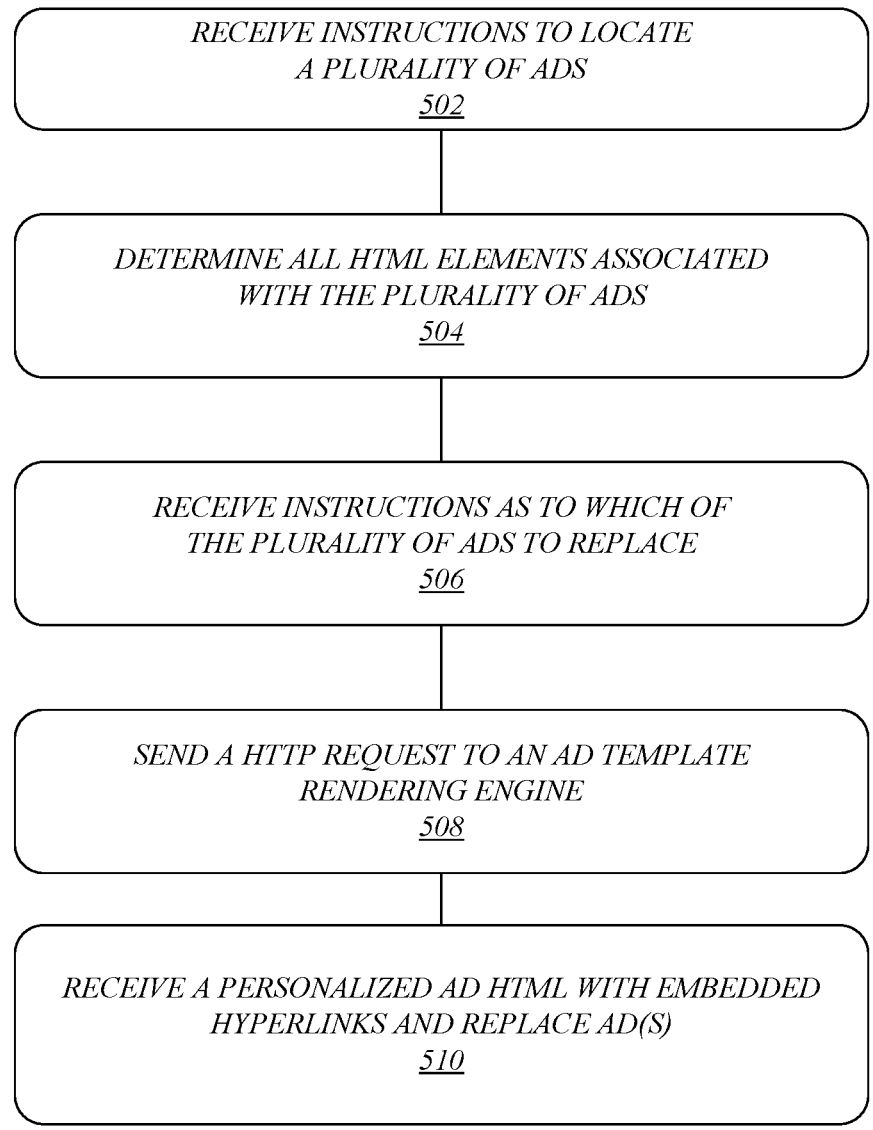
FIG. 5 illustrates a first example flow diagram in accordance with one or more embodiments.

FIG. 5 illustrates an example flow diagram 500 according to embodiments. The flow diagram 500 may be related to one or more processes performed by an ad simulator browser extension. It may be understood that the features associated with the illustrated blocks may be performed or executed by one or more computing devices (e.g., user computing device) and/or processing circuitry contained therein, such as the one illustrated in FIG. 1

At block 502, the ad simulator browser extension may receive instructions from a user, e.g., a rich media developer, designer, etc. to locate a plurality of ads on a webpage, which may be various types of display ads, such as images, video content, audio content, etc. The instructions may be received via a display ad simulator interface, such as the one shown in FIG. 2. In examples, since there may be many display or media-based content on the webpage that are unrelated to ads, the ad simulator may be configured to only locate the display or media-based content that are ads.

At block 504, the ad simulator browser extension may determine all HTML elements that are associated with the ads to locate the ads. As described above, ad-based HTML elements may have identifiers or identification tags that indicate that they are ads. Upon locating all of the ads on the webpage, the ad simulator browser extension may highlight the ads on the webpage for the convenience of the user.

At block 506, the ad simulator browser extension may further receive instructions from the user as to which of the plurality of ads are to be replaced. In examples, the user may indicate one or more ads for replacement via the display ad simulator interface. For instance, instructions may be input by way of a drop-down menu from the interface, or in other instances, the interface may allow the user to select or click the ad itself or an area or boundary around the ad.

At block 508, after one or more of the ads have been selected by the user, an HTTP request may be triggered to an ad template rendering engine, such as the ad template rendering engine 104 of FIG. 1. As described above, the HTTP call to the rendering engine may include context information, including but not limited to cookie information, the webpage URL, and size dimensions of the ad(s) to be replaced (which, as set forth above, can be automatically detected or determined by one or more components of the simulator system). The cookie information may include one or more cookie values that can indicate at least customer identity and the customer's zip code. In some examples, it may be possible for the user to change the cookie information or the cookie values sent to the ad template rendering engine in order to preview or simulate ads for customers in other locations and to view various available products (e.g., vehicles) in other zip codes.

At block 510, the ad simulator browser extension may receive an ad HTML that is personalized to the customer and may further replace the one or more existing ads on the webpage that have been marked for replacement with the new, personalized ad. In at least that regard, the user may be able to quickly and efficiently preview and simulate the new ads directly within the browser as if the customer was viewing them on the webpage.

It may be understood that the blocks illustrated in FIG. 5 are not limited to any specific order. One or more of the blocks may be performed or executed simultaneously or near simultaneously.

Figure 6:
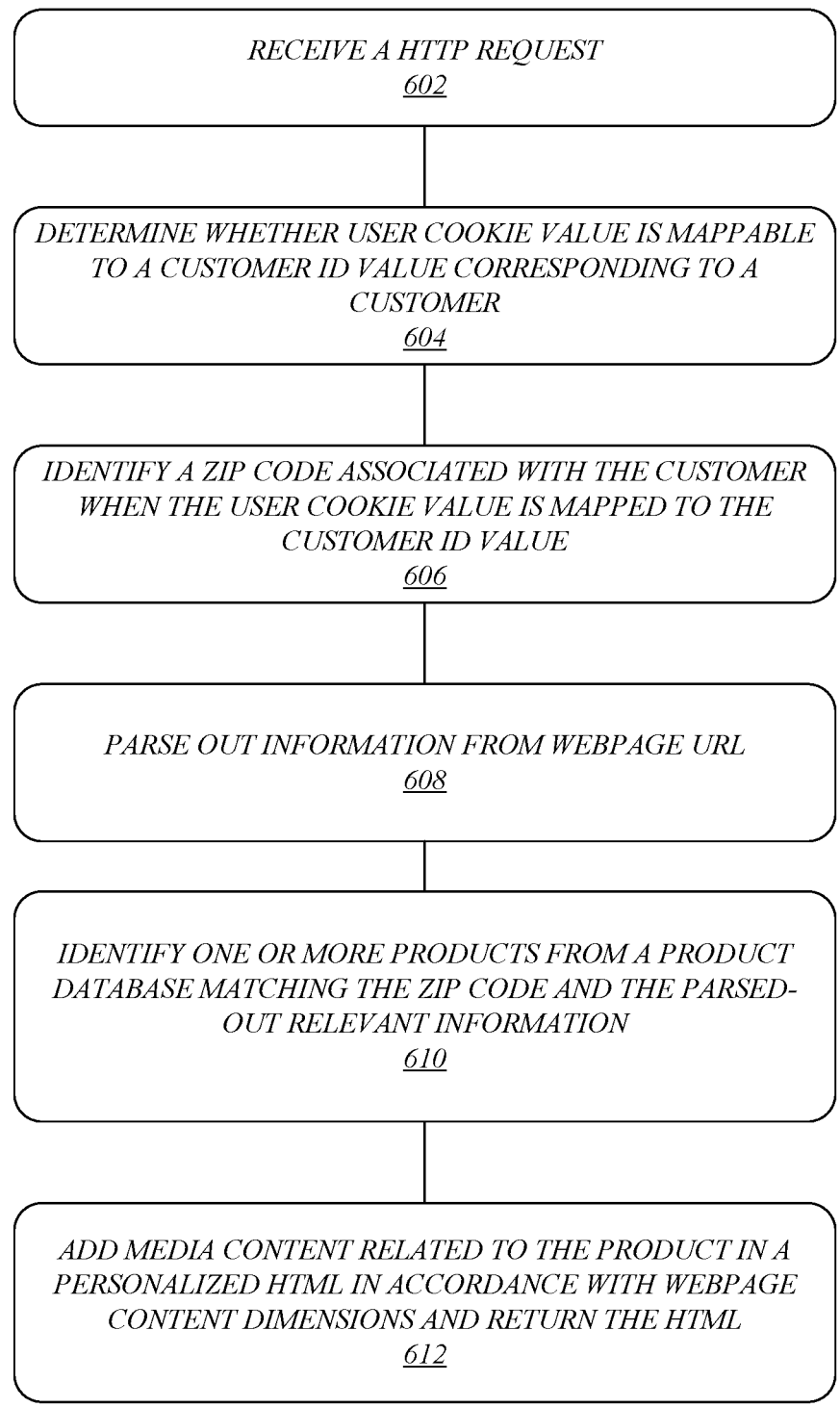
FIG. 6 illustrates a second example flow diagram in accordance with one or more embodiments.

FIG. 6 illustrates an example flow diagram 600 according to one or more embodiments. The flow diagram 600 may be related to the one or more processes performed by an ad template rendering engine such as the one illustrated in FIG. 1. It may be understood that the features associated with the illustrated blocks may be performed or executed by one or more computing devices and/or processing circuitry contained therein that can run, support, execute the ad template rendering engine.

At block 602, the ad template rendering engine may receive an HTTP request from a computing device, the HTTP request containing context information, as described above, that may allow the ad template rendering engine to return a personalized ad. In examples, the ad template rendering engine may be configured such that a personalized ad must be returned to the requesting computing device within a predefined period of time, e.g., 50 milliseconds, which ensures, for instance, a quick and efficient turnaround time for the user of the ad simulator browser extension.

At block 604, based at least in part on the cookie value provided in the context information, the ad template rendering engine may look up customer information from a customer database, which in some examples may be an in-memory database for storing information related to customers and mapping the cookie values to customer ID values for quick lookups. It is determined whether the received cookie value(s) is mappable to a customer ID value corresponding to a customer by determining whether the received cookie value(s) matches a customer cookie value associated with that customer ID value stored in the customer database. At block 606, if the cookie value can be mapped to a customer ID value, a zip code associated with the customer may be identified or obtained. In examples, one or more zip codes associated with the customers may be linked to respective customer ID values and may also be stored in the customer database for quick lookup. If the cookie value cannot be mapped to a customer ID value, the ad template rendering engine may return one or more stock ads.

At block 608, the ad template rendering engine may further parse out relevant information about the website or webpage that the user may be currently browsing from at least the received webpage URL. For example, the webpage may be part of a car review website, as described above. Thus, a URL parser may parse out information related to the car's make, model, condition, etc. Moreover, the URL parser may be configured to understand various URL schemas of different websites to parse out information more quickly and efficiently. In some examples, the parsed-out information may be normalized against internal product inventory databases.

At block 610, based on the zip code associated with the customer, information about product (e.g., vehicle make, model, condition, etc.), the ad template rendering engine may look up products that match at least these parameters from a product database. For example, the product database may include various types of information on cars (if the product is a car), such as vehicle identification numbers (VINs) and the like. The product database may also be indexed by zip code for fast lookups. In the above-described examples, a plurality of cars that are for sale or lease within a predefined geographical distance from the customer's zip code may be identified.

At block 612, media content (e.g., images, video, audio, etc.) related to the product may be added in an ad HTML in a personalized and customized manner. The media content may be added in accordance with the dimensions of the display ad. Thus, continuing the above example, a predetermined number of cars, e.g., three cars, may be identified, and further, they may be identified based on one or more criteria, such as the three least-expensive cars within the predefined geographical distance from user's zip code. The personalized ad HTML may then be returned. In at least that regard, the personalized ad is returned without the use of any proxy servers or corresponding configuration tools.

It may be understood that the blocks illustrated in FIG. 6 are not limited to any specific order. One or more of the blocks may be performed or executed simultaneously or near simultaneously.

Figure 7:
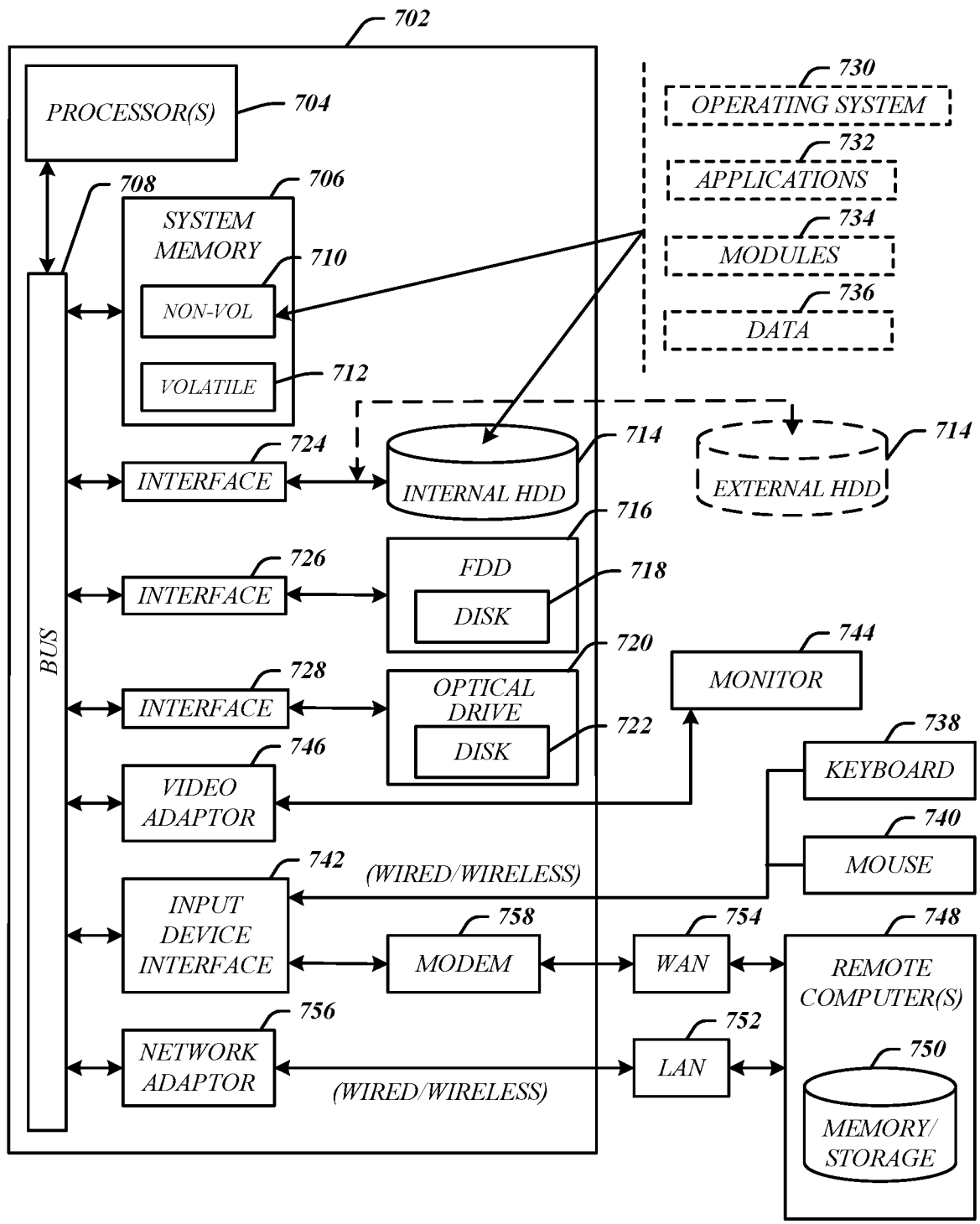
FIG. 7 illustrates an example computing architecture of a computing device in accordance with one or more embodiments.

FIG. 7 illustrates an embodiment of an exemplary computing architecture 700, e.g., of a computing device, such as a desktop computer, laptop, tablet computer, mobile computer, smartphone, etc., suitable for implementing various embodiments as previously described. In one embodiment, the computing architecture 700 may include or be implemented in one or more computing devices as part of a system, such as system 100 of FIG. 1. In one example, the computing architecture 700 may be configured to at least run, execute, and/or support computing device 102 of system 100. In another example, the computer architecture 700 may be configured to at least run, execute, and/or support the ad template rendering engine 104 of system 100 (and related components).

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes processor 704, a system memory 706 and a system bus 708. The processor 704 can be any of various commercially available processors, processing circuitry, central processing unit (CPU), a dedicated processor, a field-programmable gate array (FPGA), etc.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 800.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
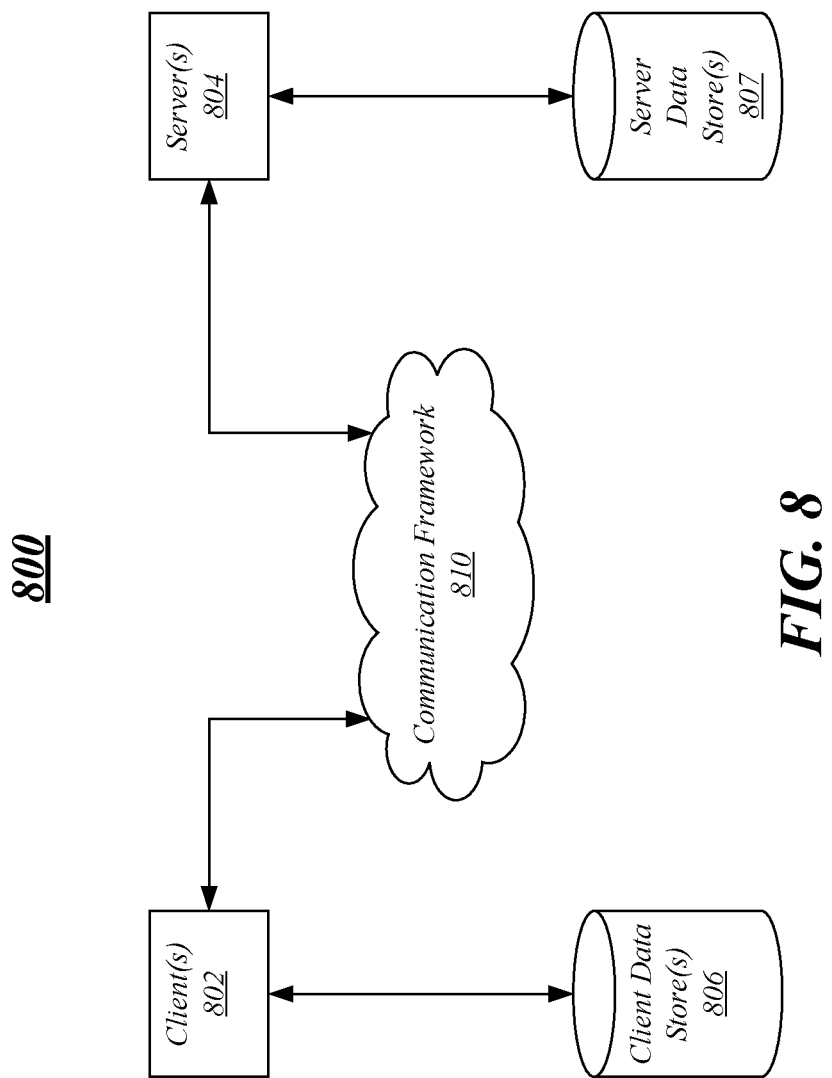
FIG. 8 illustrates an example communications architecture in accordance with one or more embodiments.

FIG. 8 is a block diagram depicting an exemplary communications architecture 800 suitable for implementing various embodiments. For example, one or more computing devices may communicate with each other via a communications framework, such as a network. At least a first computing device connected to the network may be one or more server computers, which may be implemented as a back-end server or a cloud-computing server, which may run an ad template rendering engine (e.g., ad template rendering engine 104 of ad simulation system 100) described herein and perform all related functionalities. At least a second computing device connected to the network may be a user computing device, such as the user computing device 102 of the ad simulation system 100 or any other suitable computing device.

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The one or more clients 802 and the servers 804 are operatively connected to one or more respective client data stores 806 and server data stores 807 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system comprising:
a first computing device comprising:
memory storing one or more instructions; and
one or more processors, coupled with the memory, operable to execute the one or more instructions, that when executed, cause the one or more processors to:
receive a HyperText Transfer Protocol (HTTP) request, wherein the HTTP request includes context information indicating at least a cookie value, a webpage uniform resource locator (URL) of a website, and one or more ad dimensions, the HTTP request received based, at least in part, on graphical selection of one or more ads on the website via a browser extension interface overlaid on the website, wherein the one or more ads correspond to the one or more ad dimensions;
determine whether the cookie value in the context information is mappable to a first customer identification (ID) value by determining whether the received cookie value in the context information matches a customer cookie value associated with the first customer ID value of a first customer stored in a customer database;
identify a first zip code associated with the first customer when the cookie value is mapped to the first customer ID value, wherein the first zip code is linked to the first customer ID value and stored in the customer database;
parse out, from the webpage URL, information about the website, the information including one or more of the following: (i) a vehicle make, (ii) a vehicle model, and (iii) a vehicle condition;
identify a plurality of vehicles from a vehicle database matching the first zip code and the parsed-out information parsed-out from the webpage URL, wherein the vehicle database is indexed by (i) the first zip code and (ii) the vehicle make, the vehicle model, and/or the vehicle condition;
determine at least one vehicle from the plurality of identified vehicles;
add an image of the at least one vehicle in a personalized HTML, in accordance with the received one or more ad dimensions; and
return the personalized HTML, and
wherein the cookie value is changeable by a user via the browser extension interface, a first changed cookie value being mappable to a second customer ID value of a second customer stored in the customer database, and in response to the first changed cookie value, one or more ads for vehicles located in a second zip code associated with the second customer is simulated via the browser extension interface, the second zip code being different from the first zip code.

2. The system of claim 1, wherein the one or more processors are further caused to return one or more default or stock images when the cookie value in the context information is unmappable to the first customer ID value.

3. The system of claim 1, wherein the personalized HTML is returned within a predetermined time period, and wherein the predetermined time period is 50 milliseconds.

4. The system of claim 1, wherein the determination of the at least one vehicle from the plurality of identified vehicles further comprises the one or more processors of the first computing device to:
determine two or more vehicles from the plurality of identified vehicles; and
add two or more images corresponding to the two or more vehicles in the personalized HTML in accordance with the received one or more ad dimensions.

5. The system of claim 1, wherein the personalized HTML includes one or more embedded links linking one or more webpages associated with the image of the at least one vehicle.

6. The system of claim 1, wherein the personalized HTML further includes vehicle financing information or offers associated with the at least one vehicle.

7. The system of claim 1, wherein the one or more processors of the first computing device is further caused to:
parse out the information about the website based at least in part on one or more uniform resource locator (URL) schemas; and
compare or match the information against the vehicle database.

8. The system of claim 1, further comprising a second computing device comprising:
memory; and
one or more processors to:
receive instructions to locate a plurality of ads on a webpage;
determine all HTML elements on the webpage that are associated with the plurality of ads;
receive instructions relating to which of the plurality of ads are to be replaced based on the graphical selection of the one or more ads on the website via the browser extension interface overlaid on the website; and
send the HTTP request to the first computing device.

9. The system of claim 1, wherein the personalized HTML is returned without using a proxy or a configuration tool.

10. A method comprising:
overlaying a browser extension interface on a webpage;
receiving, via the browser extension interface operated by one or more computing devices, instructions to locate a plurality of ads on a webpage;
determining, via the one or more computing devices, all HTML elements on the webpage associated with the plurality of ads based at least in part on one or more HTML identifiers associated with each of the HTML elements;
overlaying indications of the plurality of ads on the webpage
receiving, via the one or more computing devices, instructions to replace at least an ad of the plurality of ads on the webpage in response to graphical selection of the ad via the browser extension interface overlaid on the webpage;
sending, via the one or more computing devices, a HyperText Transfer Protocol (HTTP) request to an ad template rendering engine, wherein the HTTP request includes one or more cookie values, a uniform resource locator (URL) of the webpage, and one or more dimensions of the ad; and
receiving, via the one or more computing devices, an HTML for a new ad from the ad template rendering engine, and
wherein the one or more cookie values is changeable by a user via the browser extension interface, a first changed cookie value of the one or more cookie values being mappable to a first customer identification (ID) value of a first customer and a second changed cookie value being mappable to a second customer ID value of a second customer, and in response to the first changed cookie value or the second changed cookie value, one or more ads for vehicles located in a first zip code associated with the first customer or a second zip code associated with the second customer is simulated via the browser extension interface, the first zip code being different from the second zip code.

11. The method of claim 10, further comprising highlighting all of the HTML elements associated with the plurality of ads on the webpage to overlay indications of the plurality of ads on the webpage.

12. The method of claim 10, wherein the instructions to locate the plurality of ads on the webpage are received via a graphical interface element of the browser extension interface overlaid on the webpage of an ad simulator browser extension.

13. The method of claim 10, wherein the instructions to replace the ad on the webpage is received via a graphical interface element of the browser extension interface overlaid on the webpage of an ad simulator browser extension.

14. The method of claim 10, wherein the new ad includes one of more of the following: (i) one or more images, (ii) one or more embedded links, and (iii) one or more financing information or offers.

15. The method of claim 10, wherein the HTML for the new ad is returned without using a proxy server or a configuration tool.

16. A non-transitory computer-readable storage medium storing computer-readable program code executable by a processor to:
overlay a browser extension interface on a webpage;
receive, via the browser extension interface, instructions to locate a plurality of ads on a webpage;
determine all HTML elements on the webpage associated with the plurality of ads based at least in part on one or more HTML identifiers associated with each of the HTML elements;
overlay indications of the plurality of ads on the webpage;
receive instructions to replace at least an ad of the plurality of ads on the webpage in response to graphical selection of the ad via the browser extension interface overlaid on the webpage;
send a HyperText Transfer Protocol (HTTP) request to an ad template rendering engine, wherein the HTTP request includes one or more cookie values, a uniform resource locator (URL) of the webpage, and one or more dimensions of the ad; and
receive an HTML, for a new ad from the ad template rendering engine, and
wherein the one or more cookie values is changeable by a user via the browser extension interface, a first changed cookie value of the one or more cookie values being mappable to a first customer identification (ID) value of a first customer and a second changed cookie value being mappable to a second customer ID value of a second customer, and in response to the first changed cookie value or the second changed cookie value, one or more ads for vehicles located in a first zip code associated with the first customer or a second zip code associated with the second customer is simulated via the browser extension, the first zip code being different from the second zip code.

17. The non-transitory computer-readable storage medium of claim 16, wherein the HTML for the new ad is received within a predetermined period of time.

18. The non-transitory computer-readable storage medium of claim 16, wherein the predetermined period of time is 50 milliseconds.

19. The non-transitory computer-readable storage medium of claim 16, wherein the instructions to locate the plurality of ads on the webpage and the instructions to replace the ad on the webpage are input by the user via the browser extension interface of an ad simulator browser extension.

20. The non-transitory computer-readable storage medium of claim 16, wherein the new ad includes one of more of the following: (i) one or more images, (ii) one or more embedded links, and (iii) one or more financing information or offers.

* * * * *